United States Patent [19]

Reich

[11] 3,812,547
[45] May 28, 1974

[54] TOOLHOLDER WITH INTERCHANGEABLE INSERTS FOR A TANGENT CHASER

[76] Inventor: James F. Reich, 1010 Pinewood Dr., Pine City, N.Y. 14871

[22] Filed: Feb. 23, 1973

[21] Appl. No.: 335,262

[52] U.S. Cl. .................................. 10/101, 29/96
[51] Int. Cl. ........................ B23g 1/00, B23g 5/00
[58] Field of Search....... 10/101, 120, 120.5 R, 121; 29/96

[56] References Cited
UNITED STATES PATENTS

| | | | |
|---|---|---|---|
| 2,054,028 | 9/1936 | Benninghoff | 10/120.5 R |
| 2,549,381 | 4/1951 | Matica | 10/101 |
| 2,667,651 | 2/1954 | Barnes | 10/120.5 R |
| 3,084,416 | 4/1963 | Broughton | 29/96 |
| 3,187,406 | 6/1965 | Franko | 29/95 |
| 3,284,874 | 11/1966 | Green et al. | 29/96 |
| 3,488,822 | 1/1970 | Jones | 29/96 |

Primary Examiner—Charles W. Lanham
Assistant Examiner—E. M. Combs
Attorney, Agent, or Firm—Robert E. Sandt

[57] ABSTRACT

Interchangeable threading dies for an automatic self opening tangent threading die head to permit a greater range of thread pitches and diameters to be cut with a single die head. It consists of a toolholder having an effective inclined V-block mount for a complementary triangular thread cutting tool wherein the cutting forces are exerted in a direction to wedge the tool tightly against the aligning surfaces in the three freedoms of movement to compel accurate positioning of the cutting tool with respect to the holder independent of the clamping means.

1 Claim, 7 Drawing Figures

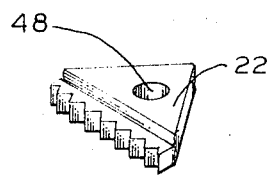
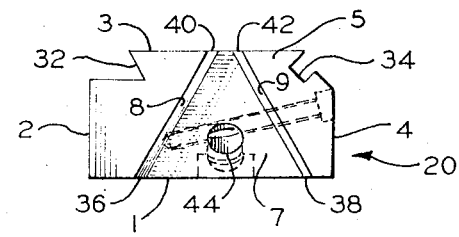
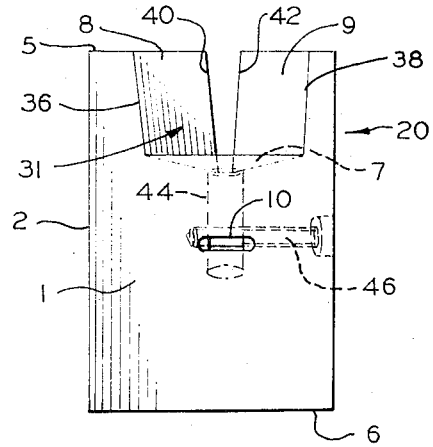
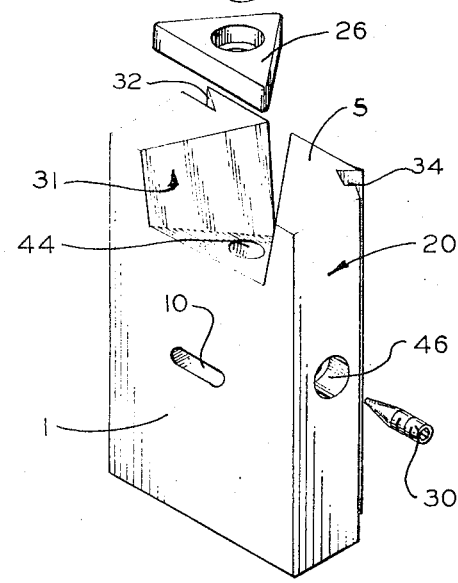
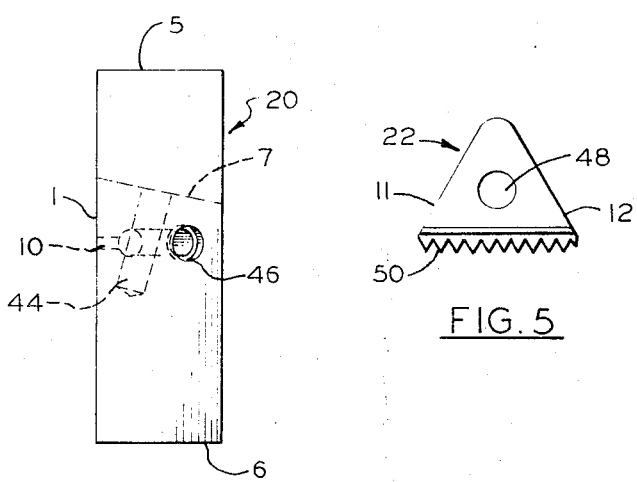
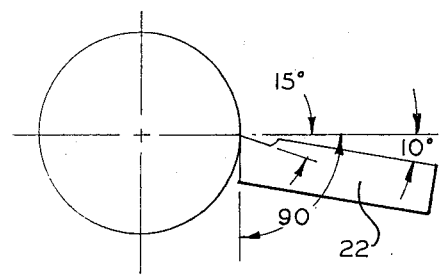
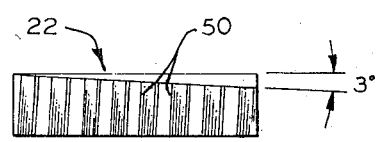

TOOLHOLDER WITH INTERCHANGEABLE INSERTS FOR A TANGENT CHASER

BACKGROUND OF THE INVENTORY

1. Field of Invention

This invention relates to the art of machining screw threads and more particularly to an improved die and toolholder for use in a tangent chaser in the cutting of male threads.

2. Prior Art

Prior art cutting tools, generally incorporated the cutting tool and holder into a single unitary structure.

This requires a matched set of dies for each different pitch and pitch diameter of threads.

SUMMARY OF INVENTION

It is an object of the invention to provide a toolholder and interchangeable die inserts adapted to be mounted in a tangent thread chaser for the machining of male threads upon a workpiece revolving relative thereto.

A further object is to provide a toolholder and threading die insert having aligning surfaces adapted to fix the position of the holder in predetermined relationship to a commercial tangent thread chaser and having further aligning surfaces defining a generally v-shaped cavity adapted to fixedly locate a generally triangularly shaped threading die insert with respect to the first aligning surfaces and thus predetermine the position of the die with respect to the tangent die chaser.

THE DRAWINGS

FIG. 1 is an exploded isometric drawing of the toolholder, die insert and associated mounting means.

FIG. 2 is a front elevation of the toolholder.

FIG. 3 is a top view of the toolholder.

FIG. 4 is a side elevation of the toolholder.

FIG. 5 is a top view of the threading die insert.

FIG. 6 shows the position of the threading die relative to a workpiece.

FIG. 7 is an edge view of the cutting tool.

DESCRIPTION OF THE PREFERRED EMBODIMENT

The toolholder and die insert shown in FIGS. 1 through 5 is typical of four duplicate assemblies that are mounted in the ways of a self-opening tangent thread chaser. Thread chasers of this nature mount the toolholders on four pivot points located at the corners of a square whose diagonals intersect on the centerline of the workpiece to be threaded.

During threading the toolholders are constrained against outward movement as the workpiece rotates and the die head advances to cut the threads. When the threads are complete an adjustable stop trips the toolholders to the open position to permit the die to be axially retracted without reversal of the rotation of the workpiece.

The toolholder to be hereinafter described in detail is specifically designed to be used in any die head using tangent chasers manufactured by the Landis Tool Company of Waynesboro, Pennsylvania, although the principles of the invention can be adapted for die heads of other manufacturers. To employ the toolholders in the die head, the next larger nominal size die head is used to mount the tools. This provides the requisite clearance for the greater bulk of the toolholder while still preserving the requisite cutting geometry.

Since the die head per se forms no part of the instant invention only the toolholder and threading die insert will be described. The toolholders mount in ways in the die head and have a shape complementary to the ways.

Referring now to the isometric drawing of FIG. 1, the toolholder 20 is seen to have the gross general shape of a rectangular parallelopiped with the plane surfaces 1 and 3 parallel and perpendicular to the mutually parallel surface pairs 2 and 4 and 5 and 6. The toolholder 20 is mounted and aligned in the requisite location in the die head by means of the grooves 32 and 34 having shapes complementary to the mounting ways of the die head.

In order that the threading die insert 22 shall be fixed in location with respect to the toolholder 20, and derivatively with respect to the die head and workpiece a V-shaped cavity 31 is cut into the toolholder. This V-cavity opens into surfaces 1, 5, and 3 and is bounded by the plane surfaces 7, 8, and 9. The surface 7 is sloped downwardly from the front surface 1 toward the rear surface 3 at an angle of 15°. The surfaces 8 and 9, if extended, would intersect with an included angle of 60° and are both perpendicular to the surface 7.

Expressed in another fashion the V-cavity is a triangular prism, the axis of which is parallel to the planes of surfaces 2 and 4, but inclined at 15° with respect to the surfaces 1 and 3, or 75° with respect to surfaces 5 and 6.

Because of the inclination of the V-cavity 31 with respect to the orthogonal axes of the toolholder 20, the cavity surfaces 8 and 9 intersect the front surface 1 at corners 36 and 38 which diverge upwardly. They also intersect the back surface 3 at corners 40 and 42 which similarly diverge.

A blind hole 44 is drilled perpendicularly downward from surface 7 into the block. The centerline of this hole with respect to surface 7 is coincident with the centerline of a circle of ½ inch diameter lying in the plane of surface 7 and tangent to the surfaces 8 and 9. By geometric derivation the distance of the centerline of this hole from the rear apex of surface 7 (if extended to form an apex) would be ½ inch.

A second blind hole 46 drilled from the surface 4 to intersect the hole 44 but with the axes of the holes passing one another, the axis of hole 46 passing to the rear (toward surface 3) of the axis of hole 44. The axis of hole 44 is parallel to the top and bottom surfaces 5 and 6 of block 20 but is inclined with respect to the remaining surfaces, being closer to surface 1 at the bottom of the hole. Hole 46 is threaded and received a conically pointed setscrew 30. A relief opening 10 is cut from the front surface 1 intersecting the hole 44 for a purpose to be described.

A triangular shaped cutting die, with hole 48 which registers with hole 44 when the die 22 is installed in registry with the cavity surfaces 8 and 9, is mounted on top of a triangular shim 26 also having a hole registered with holes 44 and 48. When the threading die 22 and shim 26 are installed in cavity 31 a camming pin with a shoulder is dropped through hole 48, the hole in shim 26 and into hole 44. A shoulder on the pin 24 bottoms in a counterbore in shim 26 to fix the axial movement of the pin. When the conical setscrew 30 is tightened, the conical end wedges or cams the bottom of pin 24 toward the front surface 1 rocking the pin toward the rear at its upper end. The spherical surface on the upper end of pin 24 coacts with hole 48 forcing the cutting die 22 downward and to the rear into the bite of the V-cavity 31, thus fixing its position and clamping it in place. The relief opening 10 permits the bottom skirt of pin 24 to move forward in the block and together with the setscrew 30 coacts with the flared skirt to hold the pin 24 tightly in the hole.

The threading die 22 as shown in detail in FIG. 5 is a standard 1 inch triangular tool blank usually made from tungsten carbide or other hard material. The surface 11 and 12 if continued would intersect at an angle of 60°, complementary to the V-cavity 31. The teeth 50 are shaped to cut the requisite shape and pitch of teeth. The teeth are cut in the face of 1 the blank at an angle to the perpendicular equal and a lead angle. Typically, 3° as shown in FIG. 7. Also a rake angle, typically 5° is ground into the tool. The tool, as the name implies, is a tangent thread chaser. This means that the cutting edge of the tool intersects the cylindrical workpiece surface at a tangent.

FIG. 6 shows the location of one of four cutting dies as they would be disposed for threading. These are located at the ends of perpendicularly oriented diameters. To adjust for various diameters of workpieces the toolholders, of which 20 is one of four, are clamped in indexed positions in the ways which coact with the grooves 32 and 34 and checked with gauges to insure their accurate location. The radial stops are set to adjust the cutting depth. Once these admustments are made the dies will produce threads to accurate tolerances even more if one or more of the cutting dies 22 requires replacement. The V-block action permits a die to be replaced and accurately positioned without further guaging or checking. This material reduces setup time when tools become dull or broken.

In its deployed condition the cutting tool 20 occupies the position shown in FIG. 6 wherein the tool face is tangent to the workpiece at the point of contact. The tool itself is inclined at 10° with respect to the diameter through the point of tangency. The rake angle is effectively 15° with respect to diameter or 5° with respect to the flat surface of the tool. This coupled with the 3° lead angle shown in FIG. 7 produces a clean thread in one pass.

From the foregoing description it will be apparent that the tooth assembly permits the use of standard tool blanks which may be accurately located and clamped in the toolholder. Also the need for brazing the cutting tool to the toolholder has been completely eliminated, and because of the precision aligning surfaces a V-block geometry, tools can be replaced either singly or in sets without changing the cutting geometry.

While the invention has been particularly described with reference to a preferred embodiment, it will be understood by those skilled in the changes and form and details may be made herein without departing from the spirit and scope of the invention.

What is claimed is:

1. A toolholder and insertable threading tool for use in a tangent type threading die head comprising:
    1. A toolholder having the gross general shape of a rectangular parallelopiped having first, second, third and fourth planar surfaces parallel to a common longitudinal axis, and fifth and sixth planar surfaces perpendicular to said axis including:
        a. At least two longitudinal grooves of constant cross section disposed with their axes parallel to said axis, the grooves having a configuration complementary to mounting and aligning structure within the dieholder;
        b. Seventh, eighth and ninth planar surfaces defining a V-shaped cavity, with said eighth and ninth surfaces each intersecting said first, fourth and fifth surface and said seventh surface intersecting said first surface, said eighth and ninth surfaces being perpendicular to said seventh surface and the planes thereof intersecting one another to include an angle less than a right angle;
        c. The said seventh surface intersecting said first surface to include an angle less than a right angle whereby the axis of the V-shaped cavity is nonparallel to the axis of the parallelopiped and the apex of the said triangular seventh surface is spaced more remote from said fifth surface than the base of said triangular seventh surface;
        d. A cylindrical bore opening into said seventh surface at substantially the center of mass thereof and perpendicular thereto;
        e. A threaded hole intersecting said bore and opening into said fourth surface;
    2. A cutting tool insert of general triangular prismatic shape having a tenth through a fourteenth surface, the first and last of which are parallel and the eleventh and twelfth intersecting with an included angle equal to the angle included between said eighth and ninth surfaces, and including:
        a. Thread cutting teeth formed in said thirteenth surface;
        b. A cylinder bore connecting said tenth and said fourteenth surfaces and aligned with the bore in said V-shaped cavity with the said eleventh surface abutting said eighth surface, said twelfh surface abutting said ninth surface and said fourteenth surface parallel to said seventh surface;
    3. A triangular prismatic shim having a cylindrical bore aligned with the bores in said insert and said toolholder sa as to space apart the said fourteenth and seventh surfaces by the thickness of the shim;
    4. A headed pin projecting seriately through said insert and said shim and into the bore in said toolholder with the head, thereof, abutting the insert, and;
    5. A threaded fastener threaded in said threaded bore and coacting with said pin to affix it in position, whereby, when said toolholder with its insert is installed in operative threading position in the dieholder, the angle of inclination of the V-shaped cavity automatically provides the requisite rake to the cutting and the cutting forces act to seat the insert more tightly within the groove to maintain accurate insert alignment, and the choice of shims provides an adjustment of the projection of the cutting teeth from the toolholder.

* * * * *